United States Patent [19]
Sheppard et al.

[11] 3,931,354
[45] Jan. 6, 1976

[54] REACTION PRODUCTS OF CARBOXYL TERMINATED 1,2-POLYBUTADIENE WITH EPOXIDES AND AROMATIC BIS(MALEIMIDES)

[75] Inventors: Clyde H. Sheppard, Rancho Palos Verdes; Robert J. Jones, Hermosa Beach, both of Calif.

[73] Assignee: TRW Inc., Redondo Beach, Calif.

[22] Filed: Aug. 26, 1974

[21] Appl. No.: 500,433

[52] U.S. Cl............. 260/836; 156/245; 260/837 R; 427/386; 428/366; 428/367; 428/392; 428/394
[51] Int. Cl.$^2$.................. C08L 63/02; C08L 63/04; C08L 63/08; C08L 63/10
[58] Field of Search.......................... 260/836, 837 R

[56] References Cited
UNITED STATES PATENTS

| | | |
|---|---|---|
| 3,515,772 | 6/1970 | Lubowitz et al.................... 260/836 |
| 3,673,274 | 6/1972 | Tomalia et al...................... 260/836 |
| 3,730,948 | 5/1973 | Akiyama et al..................... 260/836 |
| 3,738,967 | 6/1973 | Crivello........................... 260/78 UA |
| 3,763,087 | 10/1973 | Holub et al......................... 260/836 |
| 3,853,815 | 12/1974 | Lubowitz............................ 260/836 |
| 3,855,176 | 12/1974 | Skidmore........................ 260/837 R |

*Primary Examiner*—Murray Tillman
*Assistant Examiner*—Thurman K. Page
*Attorney, Agent, or Firm*—Daniel T. Anderson; Alan D. Akers; Willie Krawitz

[57] ABSTRACT

A functionally terminated polybutadiene polymer is reacted with an epoxide to produce an epoxide terminated polybutadiene. A crosslinking agent and a peroxide free radical initiator are mixed with the epoxy terminated polybutadiene, and upon reaction, a thermoset resin is produced having advanced chemical, electrical, and thermomechanical properties.

9 Claims, No Drawings

REACTION PRODUCTS OF CARBOXYL TERMINATED 1,2-POLYBUTADIENE WITH EPOXIDES AND AROMATIC BIS(MALEIMIDES)

The invention herein described was made in the course of or under a contract or subcontract thereunder, (or grant), with the Department of the Air Force.

BACKGROUND OF THE INVENTION

Advanced composite materials have been developed to where production engineering now is being phased into a heretofore purely developmental engineering effort. This integration of engineering efforts is exposing new needs for improvements in advanced composite materials. Now emphasis is being placed on the economic efficiencies of the processes used for manufacturing composites and, as these materials are being incorporated into hardware structural designs, new processes are being sought. Two major deficiencies have become apparent with regard to the state-of-the-art high performance epoxy resin systems. The first problem is the high amount of resin flow during molding which can be as much as 50 percent of the original resin content. High resin flow may be attributed to the fact that some epoxy resins are liquid and inherently possess a high resin flow during molding, while other epoxy resins which require a solvent, retain the solvent during manufacture of the resinous article. Sometimes, during processing, the resin flow is deliberately employed to wash out the retained solvent and other gaseous matter.

The second major deficiency with respect to epoxy resins is the requirement for use of autoclaves to provide the essential pressure necessary for the consolidation of complex parts. This requirement for pressure greatly limits the number of vendors capable of handling the high performance materials.

Polybutadiene resins, on the other hand, have been of considerable interest for many years because of their excellent chemical stability and good physical properties.

U.S. Pat. No. 2,586,594 taught a tough, chemically stable resin coating could be applied to a substrate by the application of the liquid polybutadiene and the subsequent peroxide cure. While this system offered the benefit of good physical and chemical properties, the liquid polybutadiene require specialized and skillful handling techniques. Further development improved this system, but the handling and workability problems were never completely overcome. More recently, U.S. Pat. No. 3,431,235 offered a solution to the problems of workability and handling by the formation of an intermediate elastomeric material which may be handled and worked without special equipment and requirements. Thus, the polymer compounder who is equipped to handle viscous and tacky material, formulates a resin composition according to the fabricators' specifications and cures the material to an intermediate elastomeric stage. The fabricator then produces the final product without the necessity of special equipment to handle viscous, tacky polymeric materials. While U.S. Pat. No. 3,431,235 taught the solution to many of the problems associated with thermoset polydiene resins, when chain extended with high molecular weight epoxy resins, the nonpolar polybutadiene resins, upon curing, had the inherent problem of exuding the uncured polar epoxy resins. This produced a tacky nonhomogeneous polymer having unusable properties.

SUMMARY OF THE INVENTION

The present invention modifies epoxy resin with polybutadienes to provide the capability of producing high performance composites comparable to present state of the art epoxides but using vacuum bagging processing technology. This is achieved by reacting a functionally terminated polydiene, such as dicarboxy-1,2-polybutadiene with diepoxide to produce a diepoxide terminated polydiene prepolymer. The epoxy terminated polydiene is mixed with maleimide crosslinking agent and a peroxide free radical initiator which, upon reaction produces a viscous resin material having the peroxide homogeneously dispersed therethrough substantially unreacted. By raising the temperature of the resin the peroxide is activated producing a hard thermoset resin. Furthermore, the resin can be polymerized and crosslinked in situ to the cured state by one heating step. The polybutadiene polymer used in the production of the thermosetting resin of this invention should have a predominant amount of the olefinic unsaturation comprising the 1,2- or pendant vinyl group configuration and preferably the olefinic unsaturation should comprise at least 80 percent of the pendant vinyl groups or the 1,2-configuration of 1,2-polybutadiene. While the molecular weights of these materials do not present a critical consideration, it is preferred that the molecular weight of the terminated polydiene range from approximately 500 to 5,000, however, with proper process adjustments higher molecular weights may be used.

DESCRIPTION OF THE PREFERRED EMBODIMENTS

To prepare the epoxide terminated polydiene adduct, a ratio of one equivalent weight of the functionally terminated 1,2-polybutadiene is reacted with two moles of a diepoxide at moderate temperatures. Although the polydiene and the diepoxide will react slowly at room temperature, temperatures of approximately 100°F to 200°F reduce the viscosity of the reactants and expedite the mixing and reaction of the polybutadiene with the epoxy.

Examples of diepoxide end-capping agents in which the unmodified epoxide groups are functionally active and suitable for the present invention are:

TABLE I epoxy novalacs
bis-epoxydicyclopentyl ether of ethylene glycol
epichlorohydrin/bis phenol A-type
1-epoxyethyl-3,4-epoxycyclohexane
dicyclopentadiene dioxide
limonene dioxide
bis (2,3-epoxypropoxy) benzene
vinylcyclohexane dioxide
3,4-epoxy-6-methylcyclohexylmethyl-3,4-epoxy-6-methylcyclohexanecarboxylate
zeaxanthin diepoxide
9,10-epoxy-12-hydroxyoctadecanoic acid triester of glycerol Generally, any aromatic or aliphatic epoxide will be suitable, for example, any alkylene epoxide, cycloalkylene epoxide, alkoxyarylene epoxide, arylene epoxide, alkycycloalkylene epoxide, cycloalkene epoxide, or alkenecycloalkylene epoxide. Polymers made with aromatic epoxy end-caps generally exhibit better thermal stability than polymers made with aliphatic epoxy end-caps. In addition, the epoxy resin must be at least difunctional and, preferably, have a molecular weight above 500 to 700. The epoxy should be above 500 to 700 molecular weight so that reasonable high performance properties will be imparted to the final product. Lower molecular weights can be used, but the product properties tend to be closer to the polybutadiene characteristics. The epoxy resin must be at least difunctional so that a functionally reactive end-capped polybutadiene molecular is produced. Upon final cure of the epoxy end-capped polybutadiene molecule, the epoxy groups react with one another to produce a linear chain or block polymer.

End-capping is accomplished by mixing the ingredients under relatively moderate conditions. The end-capping can occur at room temperature, however, the time required for the step is materially reduced by increasing the temperature to a range of approximately 125°F to 250°F. The reaction may be further accelerated by the inclusion of catalysts or epoxy accelerators. Examples of a few of the suitable catalysts or accelerators is as follows:

TABLE II tertiary aliphatic amines
$BF_3$-etherate
sodamide
zinc oxide
alkaline earth oxides
alkaline earth hydroxides
stannic chloride
sulfuric acid
diethyl zinc - water
trialkyl aluminum - chelating agent
ferrictrialkoxide
strontium amide
strontium alkoxide
calcium amide
calcium alkoxide Other general and stereospecific polymerization catalysts may be determined by referring to a standard text relating to epoxide polymerization.

The peroxide free radical initiator is incorporated into the end-capped prepolymer in either of the two ways previously described. In the method which forms the epoxy end-capped polymer for later fabrication, the peroxide, along with the maleimide is homogeneously dispersed throughout the mixture substantially unreacted. The amount of peroxide employed is generally in the range of between approximately 0.5 to 10 percent by weight of the polymer, however, these amounts are not too critical, inasmuch as amounts of peroxide above 10 percent will be operative, however, such large amounts of peroxide are undesirable from an economic standpoint. Amounts of peroxide below 0.5 percent will effect a reaction, however, the reaction is usually sluggish and sometimes the product does not have the optimum properties attainable. Other factors dependent upon the amount of peroxide used may be the particular peroxide compound used, the polydiene, and the other reactants present. Approximately 2 to 5 percent by weight of the polymer are the amounts generally preferred for the peroxide. Thus, when the peroxide is heated in the range of approximately 300° to 425°F, the peroxide is activated, and the polymer is cured to a very hard thermoset resin having improved processability. Organic peroxide free radical initiators suitable for use in this process may be selected from the following:

TABLE III di-t-butyl peroxide
2,5-dimethyl-2,5-bis(tertiary butylperoxy) hexane
n-butyl-4,4-bis(tertiary butylperoxy) valerate
2,5-dimethyl,2-5-bis(tertiary butylperoxy)hexane-3
tertiary-butyl perbenzoate
dicumyl peroxide
methyl ethyl ketone peroxide
cumene hydroperoxide
di-n-methyl-t-butyl percarbamate
lauroyl peroxide
acetyl peroxide
decanoyl peroxide
t-butyl peracetate
t-butyl peroxyisobutyrate A cross-linking agent selected from aromatic bis(maleimides), such as methylene dianiline maleimide, thiodianiline maleimide, and oxydianiline maleimide is added either to the initial reactant mix or to the epoxy capped polybutadiene. When the maleimide is added to the initial reactant mix, the mixture is polymerized in situ. When the maleimide is added to the epoxy capped polybutadiene, the mixture can be cooled and stored for moderate periods prior to subsequent manufacturing. From 0.1 to 0.8 moles of the maleimides per mole of polybutadiene can be added to the composition, and it is hypothesized that the cross-linking occurs between the maleimide end-caps and the pendant vinly groups on the polybutadiene. Thus, there will be some interdependency between the moles of maleimide used and the molecular weight and vinyl content of the polybutadiene. That is, polybutadiene having 90 percent 1,2-configuration can accept more maleimide than 60 percent 1,2-polybutadiene. Also, polybutadiene having a molecular weight of 1,000 can accept less maleimide than polybutadiene having a molecular weight of 2,000.

In another method, one equivalent weight of terminally difunctional 1,2-polybutadienediol may be reacted in a temperature range of between 75°F to 200°F with two equivalents of an organic anhydride to produce a polycarboxylic acid adduct which is subsequently end-capped with the epoxy resin. In this reaction, it is desirable to employ a equivalent amount of the dianhydride to alcohol substituents for the formation of the polycarboxylic acid adduct, however, an amount of anhydride in excess of equivalence may be used when adducts having reduced viscosities are sought.

Typical organic anhydrides which may be reacted with the dihydroxy-1,2-polybudadiene include:

TABLE IV trimellitic anhydride
hexahydrophthalic anhydride
nadic anhydride
methyl nadic anhydride
oxalic anhydride
malonic anhydride
azelaic anhydride
adipic anhydride
phthalic anhydride
pimelic anhydride
tetrahydrophthalic anhydride chlorendic anhydride
maleic anhydride
succinic anhydride
suberic anhydride
sebacic anhydride
glutaric anhydride Typical dianhydrides which are suitable for use are:

TABLE V 3,3'4,4'-benzophenone tetracarboxylic dianhydride
polyazelaic polyanhydride
pyromellitic dianhydride
pyromellitic dianhydride-glycol adducts
1,2,3,4-cyclopentanetetracarboxylic dianhydride Acid adduct formation in the present invention is important for the purpose of increasing versatility in the polybutadiene. By end-capping the polybutadiene with an anhydride, such as trimellitic anhydride, the functionality of the polybutadiene may be easily changed from 2 to 4. Another advantage of the end-cap acid adduct is that the acid strength may be changed according to the type of anhydride used. Thus, rather than being limited to an aliphatic carboxylic group as when dicarboxylic 1,2-polybutadiene is used, the polybutadiene may be end-capped with an aromatic carboxylic acid group displaying different acid strengths. The advantage lies in the fact that increased acid strengths will cause the polymerization reaction to occur more rapidly which will reduce processing time.

Polymerization occurs when the reaction of a ratio of one equivalent weight of the carboxylic acid end-capped polymer occurs with one equivalent weight of an epoxy resin, and the maleimide cross-links between the chains by reaction with the pendant vinyl groups on the 1,2-polybutadiene. The process steps may be performed in either of two sequences. By one method, the 1,2-polybutadiene, an epoxy resin, and an epoxy accelerator, if desired, is reacted in solution to a predetermined end point. A solution of maleimide and organic peroxide is mixed homogeneously into the epoxy end-capped polybutadiene solution and cooled. The solution is kept cool until readied for fabrication processing. By the second method, the entire group of reactants, via polybutadiene resin, epoxy resin, epoxy accelerator, maleimide, and organic peroxide, are mixed together in solution which is applied then to the article being fabricated and are polymerized in situ.

The polymerization reaction occurs in a temperature range of between 280°F and 400°F. At these temperatures the reaction is complete in between 10 minutes and 2 hours.

Reinforced composites can be made by impregnating fibers of boron, high modulus organic polymers, graphite, or glass first with solutions of the resin mixture, sometimes referred to as varnish. Next the impregnated fibers are dried to yield a prepreg having between 35 and 40 percent by weight solids. These prepregs are stacked then in a vacuum bag mold and cured at about 175°C for an hour to yield a very strong composite having a low void content between the sheets, usually 1 percent by volume or less.

The following examples are presented to illustrate the various features of the invetnion, and are not intended to be limiting:

EXAMPLE I

Acid End-Capped Hydroxy Terminated Polybutadiene

Approximately 89.1 grams of 1,2-polybutadienediol and approximately 10.0 grams of tetrahydrophthalic anhydride were combined in a 500 ml kettle fitted with a mechanical stirrer, a thermometer, a heating mantle, and a nitrogen inlet. The pot was heated to 120°C under nitrogen and stirred rapidly for one and a half hours under a nitrogen blanket. The finished mixture was degassed and cooled, then approximately 4.0 grams of dicumyl peroxide was added to the resin kettle at 60°C and stirred for five minutes followed by addition of approximately 1.2 grams of triethylenediamine and an additional stirring for five minutes. Finally, approximately 5.0 grams of alicyclic diepoxy carboxylate (CY-179, CIBA Industries) was added to the mixture and stirred for thirty minutes. The resin kettle contents were degassed, cast into a crystallizing dish coated with mold release, and covered with aluminum foil. The sample was then placed in an oven which was programmed as follows:

| TEMPERATURE (°C) | TIME (HOURS) |
| --- | --- |
| 90 | 16 |
| 120 | 6 |
| 130 | 16 |
| 140 | 6 |
| 170 | 16 |

The casing obtained after curing possessed the following properties:

| PROPERTY | TEST DATA |
| --- | --- |
| Tensile Strength, psi, ASTM D638 | 7,300 |
| Elongation, %, ASTM D638 | 4.0 |
| Compressive Strength, psi, ASTM D695 | 29,500 |
| Compressive Modulus, psi, ASTM D695 | 250,000 |
| Deflection, % | 18.00 |
| Specific Gravity | 1.07 |
| Shrinkage on Curing, % | 3.80 |
| Barcol Hardness | 38.00 |

EXAMPLE II

Cross-linked Polybutadiene Using Epoxy Cresol Novalac

Approximately 100.0 grams of dicarboxy terminated 1,2-polybutadiene having an 85 to 90 percent 1,2-microstructure and a molecular weight of 1,000 and 596 grams of acetone were placed in a 1,000 ml kettle fitted with a mechanical stirrer, a thermometer, a heating mantle, and a nitrogen inlet. Approximately 137.0 grams of epoxy cresol novalac having a functionality of 5.1 was placed in the kettle at room temperature and stirred for thirty minutes. Next, 2,6 grams of benzyldimethyl amine was added to the kettle and stirred for five minutes, followed by the addition of 15.0 grams of bis(maleimide) of methylenedianiline with stirring for an additional five minutes. Finally, 8.3 grams of dicumyl peroxide was added to the kettle at room temperature and stirred for five minutes.

Prepreg tapes were prepared by drum winding Hercules Type A-S continuous graphite fiber at eight tows per inch through a resin bath containing the above resin formulation. After removal from the drum, the impregnated materials were dried in an air circulating oven at 65°C for 30 minutes which was raised to 93°C for an additional 30 minutes. The volatiles content of the prepreg was determined to be 1.8 percent by weight.

Composites were fabricated from the resultant prepreg by a vacuum bag molding process using a heat-up rate of 3°C to 4°C per minute to a cure temperature of 117°C and a cure time of 60 minutes. After cure, the composites were cooled to ambient conditions under vacuum bag pressure and postcured 16 hours at 204°C in an air circulating oven.

The physical and mechanical properties were determined to be as follows:

| | |
|---|---:|
| Flexural Strength, Newtons/meter$^2$ (N/m$^2$) × 10$^8$ | |
| at 20°C | 12.55 |
| at 120°C | 8.47 |
| at 175°C | 5.57 |
| Flexural Modulus, N/m$^2$ × 10$^{10}$ | |
| at 20°C | 10.33 |
| at 120°C | 9.09 |
| at 175°C | 8.54 |
| Shear Strength, N/m$^2$ × 10$^7$ | |
| at 20°C | 8/26 |
| at 120°C | 5.38 |
| at 175°C | 3.52 |
| Density, gm/cc | 1.50 |
| Resin content, 5 by wt. | 35.70 |
| Void content, % by vol. | >1.00 |
| Fiber content, % by vol. | 55.00 |

EXAMPLE III

Cross-linked Polybutadiene Using Phenolic Novalac Epoxide

Approximately 100.0 grams of dicarboxy terminated 1,2-polybutadiene having an 85 to 90 percent 1,2-microstructure and a molecular weight of 1,000 and 596 grams of acetone were placed in a 1,000 ml kettle outfitted as in EXample II above. Approximately 45.3 grams of phenolic novalac epoxide having a functionality of 2.1 was placed in the kettle at room temperature and stirred for 30 minutes. Next, 1.7 grams of benzyldimethylamine was added to the kettle and stirred for 5 minutes, followed by the addition of 20.0 grams of bis(maleimide) of methylenedianiline with stirring for an additional fifteen minutes. Finally, 5.5 grams of dicumyl peroxide was added to the kettle at room temperature and stirred for 5 minutes.

Prepreg tapes were prepared as described in Example II above, except the volatiles content of the dried prepreg comprised 0.8 percent by weight, 37.0 percent by weight wet resin solids, and 36.8 percent by weight dry resin solids.

Composites using the above disclosed resin was fabricated as set forth in Example II above. The physical and mechanical properties were determined to be as follows:

| | |
|---|---:|
| Flexural Strength, N/m$^2$ × 10$^8$ | |
| at 20°C | 11.25 |
| at 120°C | 6.03 |
| at 175°C | 3.96 |
| Flexural Modulus, N/m$^2$ × 10$^{10}$ | |
| at 20°C | 9.03 |
| at 120°C | 9.08 |
| at 175°C | 8.48 |
| Shear Strength, N/m$^2$ ×10$^7$ | |
| at 20°C | 8.34 |
| at 120°C | 4.41 |
| at 175°C | 2.89 |
| Density, gm/cc | 1.49 |
| Resin content, % by wt. | 38.60 |
| Void content, % by vol. | >1.00 |
| Fiber content, % by vol. | 52.00 |

EXAMPLE IV

Cross-linked Polybutadiene-Epoxy Using Less Cross-linking Agent

Approximately 100.0 grams of dicarboxy terminated 1,2-polybutadiene having 85 to 90 percent of 1,2-microstructure and a molecular weight of 1,000 and 596 grams of acetone were placed in a 1,000 ml kettle outfitted as in Example II. Approximately 117.2 grams of epoxy cresol novalac having a functionality of 4.8 was placed in the kettle at room temperature and stirred for 30 minutes. Next, 2.2 grams of benzyldimethylamine was added to the kettle and stirred for five minutes, followed by the addition of 10.0 grams of bis(4-maleimidephenyl)methane with stirring for an additional 15 mintues. Finally, 7.2 grams of dicumyl peroxide was added to the kettle at room temperature and stirred for 5 minutes.

Prepreg tapes were prepared as described in Example II above, except the volatiles content of the dried prepreg comprised 2.3 percent by weight, 39.0 percent by weight wet resin solids, and 36.0 percent by weight dry resin solids.

Composites using the above disclosed resin was fabricated as set forth in Example II above, however, in addition to postcuring at 204°C, postcuring was conducted at 246°C also. The physical and mechanical properties were determined to be as follows:

| Flexural Strength, N/m$^2$ × 10$^8$ | 204°C | 246°C |
|---|---:|---:|
| at 20°C | 13.22 | 13.62 |
| at 175°C | 5.02 | 5.80 |
| Flexural Modulus, N/m$^2$ × 10$^{10}$ | | |
| at 20°C | 10.68 | 11.04 |
| at 175°C | 8.69 | 8.89 |
| Shear Strength, N/m$^2$ × 10$^7$ | | |
| at 20°C | 9.92 | 8.33 |
| at 175°C | 3.52 | 3.17 |
| Density, gm/cc | 1.52 | 1.55 |
| Resin content, % by wt. | 30.50 | 32.00 |
| Void content, % by vol. | 1.30 | 1.00 |
| Fiber content, % by vol. | 60.00 | 60.00 |

We claim:

1. A hard thermoset resin which is a reaction product of the ratio of:
   1. one mole of 1,2-polybutadiene having at least two carboxyl terminal groups;
   2. two moles of an epoxide selected from the group consisting of alkylene epoxide, cycloalkylene epoxide, alkoxyarylene epoxide, arylene epoxide, alkyl cycloalkylene epoxide, cycloalkene epoxide, and alkylenecycloalkylene epoxide;
   3. 0.1 to 0.8 moles of an aromatic amine maleimide per mole of 1,2-polybutadiene; and
   4. a peroxide free radical initiator.

2. A hard thermoset resin according to claim 1 wherein:
   said maleimide is selected from the group consisting of methylene dianiline maleimide, thiodianiline, meta-phenylene diamine maleimide, maleimide, and oxydianiline maleimide.

3. A thermosetting polymer comprising a reaction product of the ratio of:

1. one mole of 1,2-polybutadiene having at least two carboxyl terminal groups;
2. two moles of an expoxide selected from the group consisting of alkylene epoxide, cycloalkylene epoxide, alkoxyarylene epoxide, arylene epoxide, alkyl cycloalkylene epoxide, cycloalkene epoxide, and alkylenecycloalkylene epoxide;
3. 0.1 to 0.8 moles of an aromatic amine maleimide per mole of 1,2-polybutadiene; and
4. a peroxide free radical initiator homogeneously dispersed throughout the reaction product.

4. A thermosetting polymer according to claim 3 wherein:
said epoxide is selected from the group consisting of alkylene epoxide, cycloalkylene epoxide, alkoxyarylene alkylcycloalkylene arylene epoxide, alkycycloalkylene epoxide, cycloalkene epoxide, and alkenecycloalkylene epoxide.

5. A thermosetting polymer according to claim 3 wherein:
said maleimide is selected from the group consisting of methylene dianiline maleimide, thiodianiline maleimide, meta-phenylene diamine maleimide, and oxydianiline maleimide.

6. A method of producing a hard thermoset polybutadiene-epoxy resin comprising:
A. reacting by ratio (1) one mole of 1,2-polybutadiene having at least two carboxyl terminal groups with (2) two moles of an epoxide to form an epoxy end-capped polybutadiene; B. mixing the epoxy end-capped polybutadiene terminated adduct with (3) a peroxide free radical initiator and (4) 0.1 to 0.8 moles of an aromatic amine maleimide per mole of 1,2-polybutadiene; and C. curing the mixture to a hard thermoset resin.

7. A method according to claim 6 wherein:
said epoxide is selected from the group consisting of alkylene epoxide, cycloalkylene epoxide, alkoxyarylene epoxide, arylene epoxide, alkylcycloalkylene epoxide, cycloalkene epoxide, and alkenecycloalkylene epoxide.

8. A method according to claim 6 wherein:
said maleimide is selected from the group consisting of methylene dianiline maleimide, thiodianiline maleimide, and oxydianiline maleimide.

9. A method according to claim 6 wherein:
the two dicarboxyl terminated groups are formed by the reaction of one equivalent of dihydroxy-1,2-polybutadiene with one equivalent of an acid anhydride and is selected from the group consisting of trimellitic anhydride; tetrahydrophthalic anhydride; hexahydrophthalic anhydride; tetrachlorophthalic anhydride, tetrabromophthalic anhydride; chlorendic anhydride; nadic anhydride; maleic anhydride; oxalic anhydride; succinic anhydride; malonic anhydride; suberic anhydride; azelaic anhydride; sebacic anhydride; adipic anhydride; glutaric anhydride; pimelic anhydride; phthalic anhydride; 3,4',4,4'-benzophenone tetracarboxylic dianhydride; polyazelaic polyanhydride, pyromellitic dianhydride; 1,2,3,4,-cyclopentane tetracarboxylic dianhydride; and endo-cis bicyclo (2.2.1)-5-heptene-2,3-dicarboxylic dianhydride.

* * * * *